United States Patent
Mehdizade et al.

(10) Patent No.: US 11,577,707 B2
(45) Date of Patent: Feb. 14, 2023

(54) SYSTEMS AND METHODS FOR BRAKING IN AN AUTONOMOUS VEHICLE

(71) Applicant: GM GLOBAL TECHNOLOGY OPERATIONS LLC, Detroit, MI (US)

(72) Inventors: Mohsen Mehdizade, Toronto (CA); Edward T. Heil, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 707 days.

(21) Appl. No.: 16/662,060

(22) Filed: Oct. 24, 2019

(65) Prior Publication Data

US 2021/0122343 A1    Apr. 29, 2021

(51) Int. Cl.

| | |
|---|---|
| *B60T 8/94* | (2006.01) |
| *B60T 8/17* | (2006.01) |
| *B60T 8/171* | (2006.01) |
| *B60T 8/34* | (2006.01) |
| *B60T 8/88* | (2006.01) |

(52) U.S. Cl.
CPC .................. *B60T 8/94* (2013.01); *B60T 8/17* (2013.01); *B60T 8/171* (2013.01); *B60T 8/34* (2013.01); *B60T 8/885* (2013.01); *B60T 2240/00* (2013.01); *B60T 2250/00* (2013.01); *B60T 2270/402* (2013.01); *B60T 2270/406* (2013.01); *B60T 2270/413* (2013.01); *B60T 2270/88* (2013.01)

(58) Field of Classification Search
CPC ....................................................... B60T 8/885
See application file for complete search history.

(56) References Cited

U.S. PATENT DOCUMENTS

| | | | |
|---|---|---|---|
| 2016/0009257 A1* | 1/2016 | Joyce ...................... | B60T 8/885 701/70 |
| 2016/0009267 A1* | 1/2016 | Lesinski, Jr. ............. | B60T 7/12 303/10 |
| 2016/0082937 A1* | 3/2016 | Nakaoka .................. | B60T 8/321 303/15 |
| 2018/0050704 A1 | 2/2018 | Tascione et al. | |

FOREIGN PATENT DOCUMENTS

DE    102017217856 A1    4/2019

\* cited by examiner

*Primary Examiner* — Imran K Mustafa
(74) *Attorney, Agent, or Firm* — Lorenz & Kopf LLP (57) ABSTRACT

Braking systems and methods for an autonomous vehicle are provided. Braking devices are associated with respective wheels of the autonomous vehicle. A hydraulic circuit is connected between a primary braking module (PBM) and the braking devices and connected between a secondary braking module (SBM) and the braking devices. One of a PBM electronic control unit and a SBM electronic control unit is configured to: in response to detecting a communications failure of the other braking module, apply a predetermined hydraulic pressure operation in the hydraulic circuit. The other of the PBM electronic control unit and the SBM electronic control unit is configured to identify, based on output from the at least one sensor, the predetermined hydraulic pressure operation being applied by the one of the PBM electronic control unit and the SBM electronic control unit, and select and execute a braking profile based thereon.

20 Claims, 6 Drawing Sheets

SYSTEMS AND METHODS FOR BRAKING IN AN AUTONOMOUS VEHICLE

TECHNICAL FIELD

The present disclosure generally relates to autonomous vehicles, and more particularly relates to systems and methods for braking in autonomous vehicle when one of primary and secondary braking modules suffer a communications failure.

BACKGROUND

An autonomous vehicle is a vehicle that is capable of sensing and navigating its environment with little or no user input. Vehicle automation has been categorized into numerical levels ranging from Level Zero, corresponding to no automation with full human control, to Level Five, corresponding to full automation with no human control. Various automated driver-assistance systems, such as cruise control, adaptive cruise control, and parking assistance systems correspond to lower automation levels, while true "driverless" vehicles correspond to higher automation levels. Even though autonomous vehicles have made great advances in recent years, designers continue to seek improvements, particularly with respect to navigation functionality such as trajectory planning.

Some designs of autonomous vehicles have primary and secondary braking modules to provide for redundant braking control. Such modules may communicate with each other and with an autonomous driving controller over a communications bus.

Accordingly, it is desirable to provide systems and methods that perform improved braking operation selection when one of the braking modules has a communications failure, particularly systems and methods that do not require core hardware changes in existing communications buses and hydraulic circuitry. Furthermore, other desirable features and characteristics of the systems and methods will become apparent from the subsequent detailed description and the appended claims, taken in conjunction with the accompanying drawings and the foregoing technical field and background.

SUMMARY

In one aspect, a braking system for an autonomous vehicle is provided. A primary braking module (PBM) includes a PBM electronic control unit and at least one sensor. A secondary braking module (SBM) includes a SBM electronic control unit and at least one sensor. Braking devices are associated with respective wheels of the autonomous vehicle. A hydraulic circuit is connected between the PBM and the braking devices and connected between the SBM and the braking devices. A communications bus is connected between an autonomous driving system and each of the PBM and the SBM. One of the PBM electronic control unit and the SBM electronic control unit is configured to: detect a communications failure of the other of the PBM electronic control unit and the SBM electronic control unit over the communication bus, in response to detecting the communications failure, apply a predetermined hydraulic pressure operation in the hydraulic circuit. The other of the PBM electronic control unit and the SBM electronic control unit is configured to: identify, based on output from the at least one sensor, the predetermined hydraulic pressure operation, or the absence thereof, being applied by the one of the PBM electronic control unit and the SBM electronic control unit, and to select and execute a braking operation based on the identifying of the predetermined hydraulic pressure operation.

In embodiments, the predetermined hydraulic pressure operation is hydraulic pulses and the at least one sensor includes a pressure sensor configured to sense the hydraulic pulses. In embodiments, the hydraulic pulses are non-intrusive for any passengers in the autonomous vehicle.

In embodiments, the predetermined hydraulic pressure operation applies sufficient hydraulic pressure to perform a braking operation and the at least one sensor is configured to sense effects of braking on the motion of the autonomous vehicle. In embodiments, the at least one sensor includes a wheel speed sensor and/or an inertial measurement unit and/or a GPS device and/or a vision system.

In embodiments, the at least one sensor includes at least one pressure sensor and the PBM electronic control unit is configured to: detect a communications failure of the SBM electronic control unit over the communication bus, and in response to detecting the communications failure, apply a predetermined pattern of hydraulic pressure pulses in the hydraulic circuit. The SBM electronic control unit is configured to: identify, based on output from the at least one pressure sensor, the predetermined pattern of hydraulic pressure pulses, or the absence thereof, being applied by the PBM electronic control unit. The SBM electronic control unit, the PBM electronic control unit and/or an autonomous vehicle controller is configured to select and execute a braking operation based on the identifying of the predetermined pattern of hydraulic pressure pulses. In embodiments, the at least one sensor includes at least one motion sensor and the SBM electronic control unit is configured to: detect a communications failure of the PBM electronic control unit over the communication bus, and in response to detecting the communications failure, apply a predetermined braking operation using the hydraulic circuit. The PBM electronic control unit is configured to: identify, based on output from the at least one motion sensor, the predetermined braking operation being applied by the SBM electronic control unit. The PBM electronic control unit, the SBM electronic control unit and/or an autonomous vehicle controller is configured to select and execute a braking operation based on the identifying of the predetermined pattern of hydraulic pressure pulses.

In embodiments, the other of the PBM electronic control unit and the SBM electronic control unit is configured to select and execute an emergency braking operation when the predetermined hydraulic pressure operation is not identified. The PBM electronic control unit, the SBM electronic control unit and/or an autonomous vehicle controller is configured to select and execute a braking operation by which the vehicle pulls over to the side of the road when the predetermined hydraulic pressure operation is identified.

In another aspect, a method for braking in an autonomous vehicle is provided. A primary braking module (PBM) includes a PBM electronic control unit and at least one sensor. A secondary braking module (SBM) includes a SBM electronic control unit and at least one sensor. Braking devices are associated with respective wheels of the autonomous vehicle. A hydraulic circuit is connected between the PBM and the braking devices and connected between the SBM and the braking devices. A communications bus is connected between an autonomous driving system and each of the PBM and the SBM. The method includes one of the PBM electronic control unit and the SBM electronic control unit performing the steps: detecting a communications failure of the other of the PBM electronic control unit and the SBM electronic control unit over the communication bus, and in response to detecting the communications failure, applying a predetermined hydraulic pressure operation in the hydraulic circuit. The other of the PBM electronic control unit and the SBM electronic control unit performing the steps: identifying, based on output from the at least one sensor, the predetermined hydraulic pressure operation, or the absence thereof, being applied by the one of the PBM electronic control unit and the SBM electronic control unit, and selecting and executing a braking operation based on the identifying of the predetermined hydraulic pressure operation.

In embodiments, the predetermined hydraulic pressure operation is application of hydraulic pulses and the at least one sensor includes a pressure sensor sensing the hydraulic pulses. In embodiments, the hydraulic pulses are non-intrusive for any passengers in the autonomous vehicle.

In embodiments, the predetermined hydraulic pressure operation applies sufficient hydraulic pressure to perform a braking operation and the at least one sensor senses effects of braking on the motion of the autonomous vehicle. In embodiments, the at least one sensor includes a wheel speed sensor and/or an inertial measurement unit and/or a GPS device and/or a vision system.

In embodiments, the at least one sensor includes at least one pressure sensor and the PBM electronic control unit performs the steps: detecting a communications failure of the SBM electronic control unit over the communication bus, and in response to detecting the communications failure, applying a predetermined pattern of hydraulic pressure pulses in the hydraulic circuit. The SBM electronic control unit performs the step: identifying, based on output from the at least one pressure sensor, the predetermined hydraulic pressure pulses, or the absence thereof, being applied by the PBM electronic control unit. The SBM electronic control unit, and/or the PBM electronic control unit and/or an autonomous vehicle controller selects and executes a braking profile based on the identifying of the predetermined pattern of hydraulic pressure pulses.

In embodiments, the at least one sensor includes at least one motion sensor and the SBM electronic control unit performs the steps: detecting a communications failure of the PBM electronic control unit over the communication bus, and in response to detecting the communications failure, applying a predetermined braking operation using the hydraulic circuit. The PBM electronic control unit performs the step: identifying, based on output from the at least one motion sensor, the predetermined braking operation, or the absence thereof, being applied by the SBM electronic control unit. The PBM electronic control unit, the SBM electronic control unit and/or an autonomous vehicle controller selects and executes a braking profile based on the identifying of the predetermined pattern of hydraulic pressure pulses.

In embodiments, the other of the PBM electronic control unit and the SBM electronic control unit selects and executes an emergency braking profile when the predetermined hydraulic pressure operation is not identified and the PBM electronic control unit, the SBM electronic control unit and/or an autonomous vehicle controller selects and executes a braking operation by which the vehicle pulls over to the side of the road when the predetermined hydraulic pressure operation is identified.

In another aspect, an autonomous vehicle is provided. A primary braking module (PBM) includes a PBM electronic control unit and at least one sensor. A secondary braking module (SBM) includes a SBM electronic control unit and at least one sensor. Braking devices are associated with respective wheels of the autonomous vehicle. A hydraulic circuit is connected between the PBM and the braking devices and connected between the SBM and the braking devices. A communications bus is connected between an autonomous driving system and each of the PBM and the SBM. One of the PBM electronic control unit and the SBM electronic control unit is configured to: detect a communications failure of the other of the PBM electronic control unit and the SBM electronic control unit over the communication bus, and in response to detecting the communications failure, apply a predetermined hydraulic pressure operation in the hydraulic circuit. The other of the PBM electronic control unit and the SBM electronic control unit is configured to identify, based on output from the at least one sensor, the predetermined hydraulic pressure operation, or the absence thereof, being applied by the one of the PBM electronic control unit and the SBM electronic control unit, and select and execute a braking operation based on the identifying of the predetermined hydraulic pressure operation.

In embodiments, the at least one sensor includes at least one pressure sensor and the PBM electronic control unit is configured to: detect a communications failure of the SBM electronic control unit over the communication bus, and in response to detecting the communications failure, apply a predetermined pattern of hydraulic pressure pulses in the hydraulic circuit. The SBM electronic control unit is configured to: identify, based on output from the at least one pressure sensor, the predetermined hydraulic pressure pulses, or the absence thereof, being applied by the PBM electronic control unit. The PBM electronic control unit, the SBM electronic control unit and/or an autonomous vehicle controller is configured to select and execute a braking operation based on the identifying of the predetermined pattern of hydraulic pressure pulses.

In embodiments, the at least one sensor includes at least one motion sensor and the SBM electronic control unit is configured to: detect a communications failure of the PBM electronic control unit over the communication bus, and in response to detecting the communications failure, apply a predetermined braking operation using the hydraulic circuit. The PBM electronic control unit is configured to identify, based on output from the at least one motion sensor, the predetermined braking operation, or the absence thereof, being applied by the SBM electronic control unit, and the PBM electronic control unit, the SBM electronic control unit and/or an autonomous vehicle controller is configured to select and execute a braking profile based on the identifying of the predetermined pattern of hydraulic pressure pulses.

In embodiments, the other of the PBM electronic control unit and the SBM electronic control unit is configured to select and execute an emergency braking profile when the predetermined hydraulic pressure operation is not identified. The PBM electronic control unit, the SBM electronic control unit and/or an autonomous vehicle controller is configured to select and execute a braking operation by which the vehicle pulls over to the side of the road when the predetermined hydraulic pressure operation is identified.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
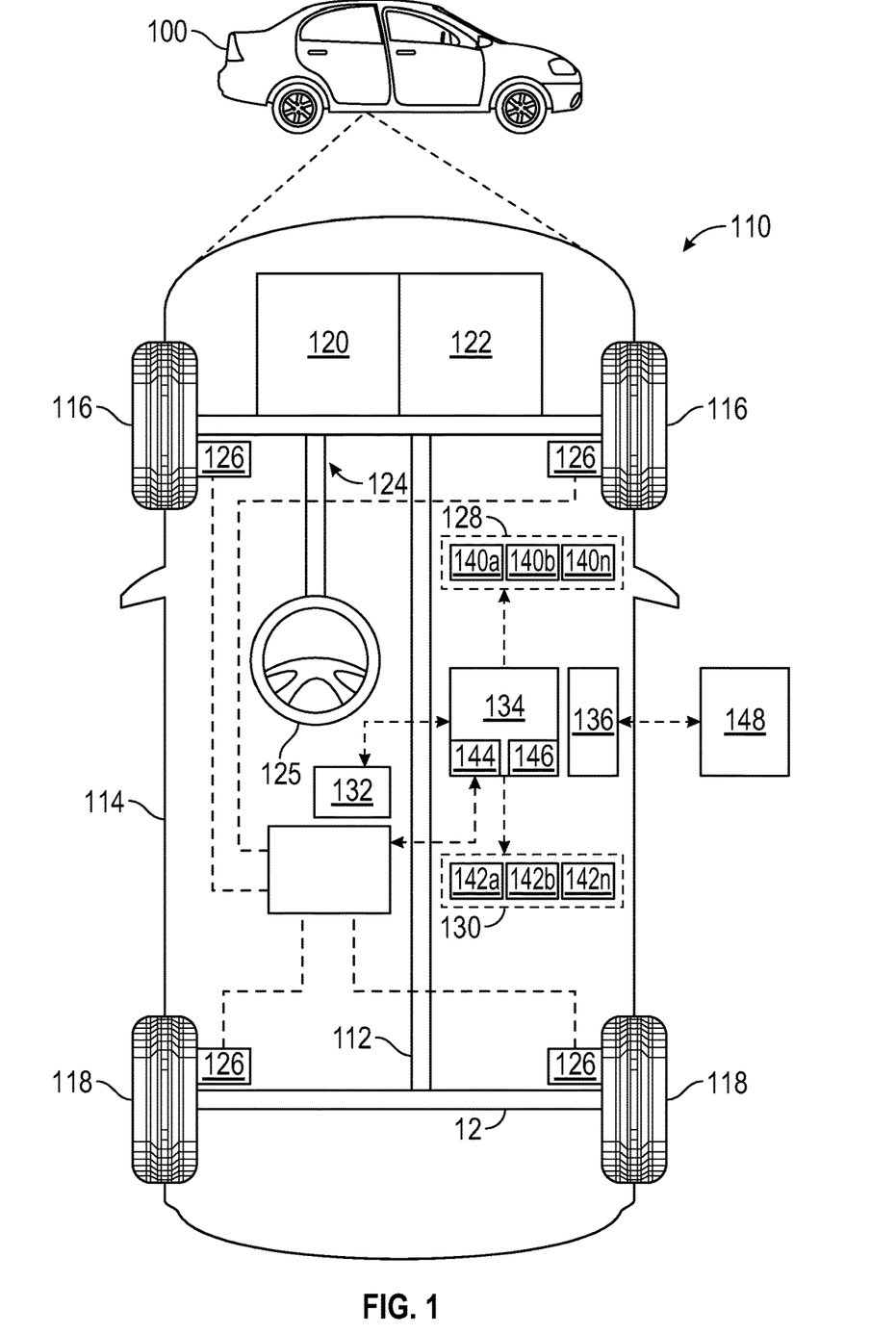
FIG. 1 is a block diagram of an autonomous driving vehicle system in accordance with an exemplary embodiment.

FIG. 1 is a block diagram of an autonomous driving vehicle system 110 implemented in a vehicle 100 in accordance with an exemplary embodiment. In various embodiments, the vehicle 100 is an autonomous vehicle that is automatically controlled to carry passengers from one location to another. In general, the autonomous driving vehicle system 110 includes a braking system 300 that uses a hydraulic communication path for communicating braking commands in the event of failure in communication over a communications bus, as described in greater detail below. As used herein, the autonomous driving vehicle system 110 refers to the various hardware and software components and systems that enable the vehicle 100 to be operated autonomously and may be considered to include the vehicle 100, as well as cooperating elements outside of the vehicle 100.

The vehicle 100 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 100 may be characterized as Level Four or Level Five automation. Generally, Level Four indicates "high automation", referring to the driving mode-specific performance by an automated driving system of all aspects of the dynamic driving task, even if a human driver does not respond appropriately to a request to intervene; and Level Five indicates "full automation", referring to the full-time performance by an automated driving system of all aspects of the dynamic driving task under all roadway and environmental conditions that can be managed by a human driver.

As depicted in FIG. 1, the vehicle 100 generally includes a chassis 112, a body 114, front wheels 116, and rear wheels 118. The body 114 is arranged on the chassis 112 and substantially encloses components of the vehicle 100. The body 114 and the chassis 112 may jointly form a frame. The wheels 116, 118 are each rotationally coupled to the chassis 112 near a respective corner of the body 114.

As shown, the vehicle 100 generally includes a propulsion system 120, a transmission system 122, a steering system 124, braking devices 126, a sensor system 128, an actuator system 130, at least one data storage device 132, at least one vehicle controller 134, and a communication system 136. Any one or more of these components or aspects thereof may be considered part of the overall autonomous driving vehicle system 110.

The propulsion system 120 may, in various embodiments, include an internal combustion engine, an electric machine such as a traction motor, and/or a fuel cell propulsion system. The transmission system 122 is configured to transmit power from the propulsion system 120 to the vehicle wheels 116, 118 according to selectable speed ratios. According to various embodiments, the transmission system 122 may include a step-ratio automatic transmission, a continuously-variable transmission, or other appropriate transmission. The braking devices 126 are part of braking system 300 (described further below) and are configured to provide braking torque to the vehicle wheels 116, 118. The braking devices 126 may, in various embodiments, include friction brakes, brake by wire, a regenerative braking system such as an electric machine, and/or other appropriate braking devices. The steering system 124 influences a position of the of the vehicle wheels 116, 118. While depicted as including a steering wheel for illustrative purposes, in some embodiments contemplated within the scope of the present disclosure, the steering system 124 may not include a steering wheel.

The sensor system 128 includes one or more sensing devices 140a-140n that sense observable conditions of the exterior environment and/or the interior environment of the vehicle 100. The sensing devices 140a-140n can include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as, but not limited to, the propulsion system 120, the transmission system 122, the steering system 124, and the braking devices 126. In various embodiments, the vehicle features can further include interior and/or exterior vehicle features such as, but are not limited to, doors, a trunk, and cabin features such as air, music, lighting, etc. (not numbered).

The data storage device 132 stores data for use in automatically controlling the vehicle 100. In various embodiments, the data storage device 132 stores defined maps of the navigable environment. In various embodiments, the defined maps may be predefined by and obtained from a remote system (described in further detail with regard to FIG. 2). For example, the defined maps may be assembled by the remote system and communicated to the vehicle 100 (wirelessly and/or in a wired manner) and stored in the data storage device 132. As can be appreciated, the data storage device 132 may be part of the controller 134, separate from the controller 134, or part of the controller 134 and part of a separate system.

Figure 3:
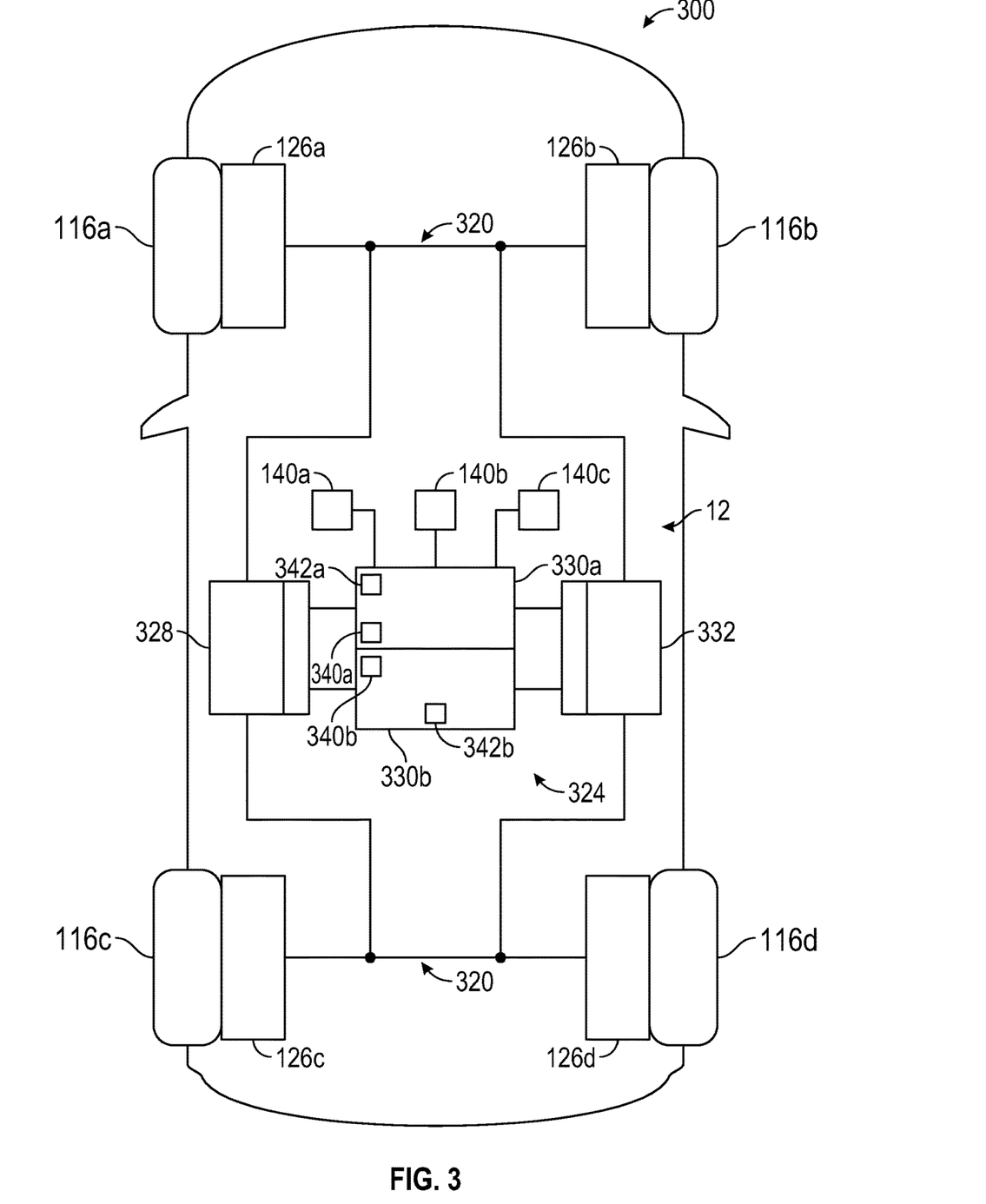
FIG. 3 is a block diagram of a braking system for the autonomous driving vehicle system of FIG. 1 in accordance with an exemplary embodiment.

With brief reference to FIG. 3, braking system 300 includes a primary braking module, PBM, electronic control unit, ECU, 330a and a secondary braking module, SBM, ECU 330b. The PBM ECU 330a and the SBM ECU 330b each include a processor 340a, 340b and a computer readable storage device or media 342a, 342b.

The vehicle controller 134 includes at least one processor 144 and a computer readable storage device or media 146. The processors 144, 340a, 340b can be any custom made or commercially available processor, a central processing unit (CPU), a graphics processing unit (GPU), an auxiliary processor among several processors, a semiconductor based microprocessor (in the form of a microchip or chip set), a macroprocessor, any combination thereof, or generally any device for executing instructions. The computer readable storage devices or media 146, 342a, 342b may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device or media 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the vehicle 100 and by the PBM ECU 330a and the SBM ECU 330b in controlling braking system 300.

Figure 4:
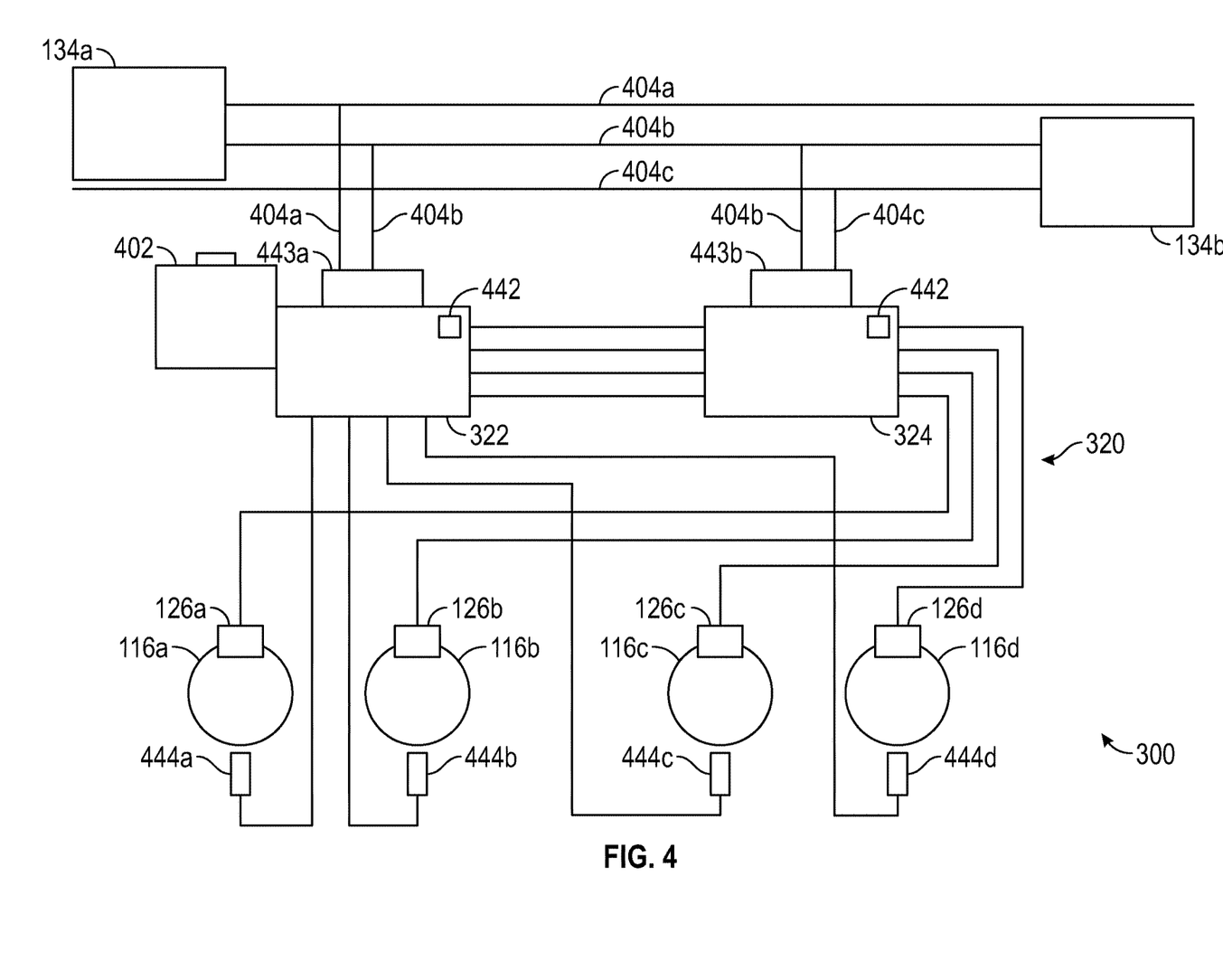
FIG. 4 is a schematic block diagram of the braking system in accordance with an exemplary embodiment.

The instructions may include one or more separate programs, each of which comprises an ordered listing of executable instructions for implementing logical functions. The instructions, when executed by the processors 144, 340a, 340b receive and process signals from the sensor system 128, perform logic, calculations, methods and/or algorithms for automatically controlling the components of the vehicle 100 and the braking system 300, and generate control signals to the actuator system 130 to automatically control the components of the vehicle 100 and the braking system 300 based on the logic, calculations, methods, and/or algorithms. Although only one controller 134 is shown in FIG. 1, embodiments of the autonomous vehicle 100 can include more than one controller 134 (as shown in FIG. 4 below) that communicate over any suitable communication medium or a combination of communication mediums and that cooperate to process the sensor signals, perform logic, calculations, methods, and/or algorithms, and generate control signals to automatically control features of the vehicle 100.

In various embodiments, one or more instructions of the controller 134 are embodied in generating and exchanging data and commands between braking system 300 and controller 134 for executing braking operations. Further, and with brief reference to FIG. 3, one or more instructions of the PBM ECU 330a and the SBM ECU 330b, when executed by the respective processors 340a, 340b, detect a communications failure of one of primary braking module, PBM, 322 and secondary braking module, SBM, 324 and to control the other of PBM 322 and SBM 324 to responsively generate communication signals over a communication path through a hydraulic circuit 320. The instructions control the one of the PBM 322 and the SBM 324 to sense the hydraulic communication signals (or the absence thereof) and to determine a braking operation based thereon.

Figure 2:
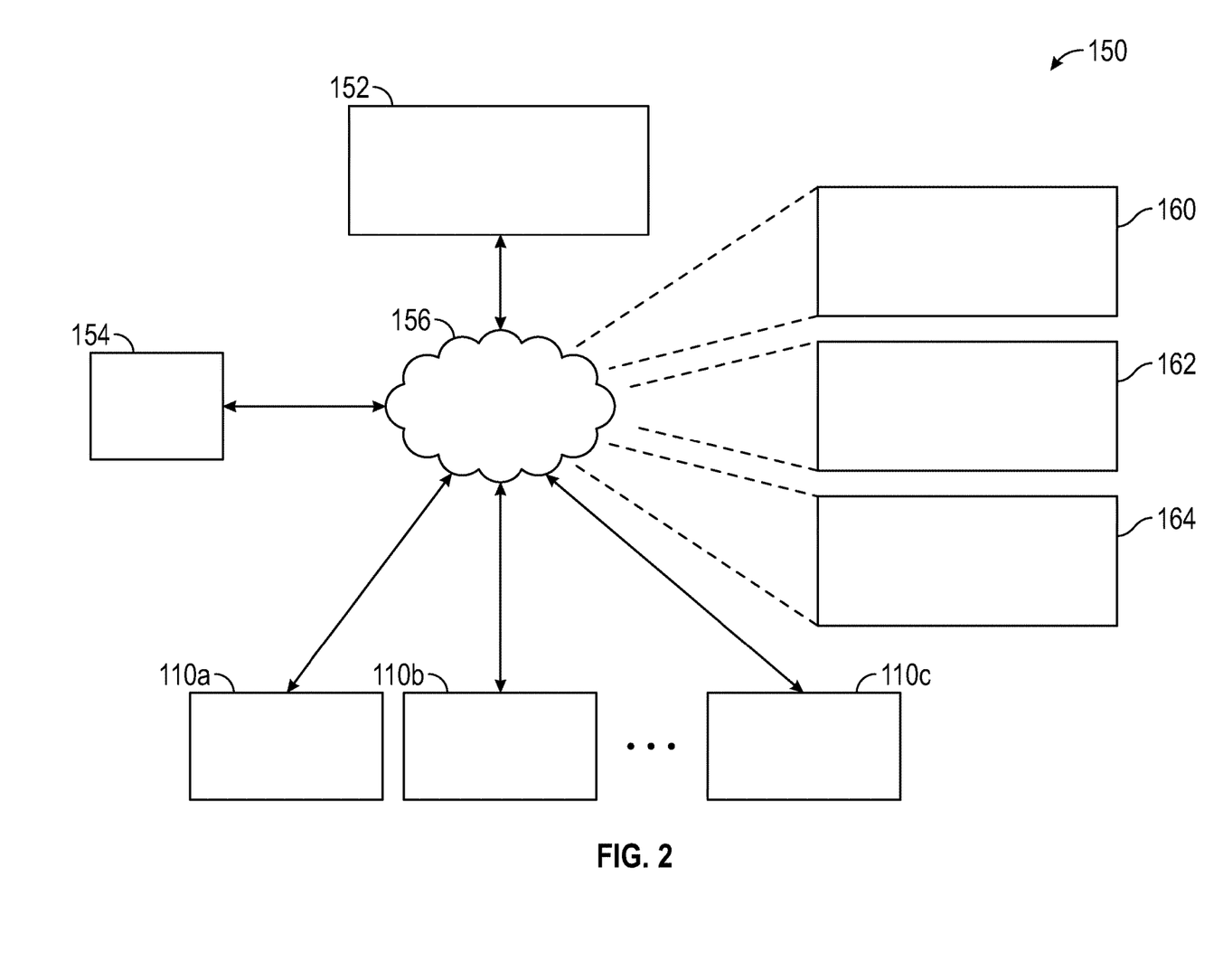
FIG. 2 is a block diagram of a transportation environment in which one or more autonomous vehicles operate in accordance with an exemplary embodiment.

The communication system 136 is configured to wirelessly communicate information to and from other entities 148, such as but not limited to, other vehicles ("V2V" communication), infrastructure ("V2I" communication), remote systems, and/or personal devices (described in more detail with regard to FIG. 2). In an exemplary embodiment, the communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

FIG. 2 is a block diagram of a transportation environment 150 in which one or more autonomous vehicles 100a-100n operate in accordance with an exemplary embodiment. In various embodiments, the environment 150 of FIG. 2 may be associated with an autonomous vehicle based remote transportation system 152, such as one suitable for use in the context of a taxi or shuttle system in a certain geographical area (e.g., a city, a school or business campus, a shopping center, an amusement park, an event center, or the like) or one simply be managed by a remote system. Any one or more vehicles 100a-100n depicted in FIG. 2 may correspond to the vehicle 100 of FIG. 1. In other embodiments, the vehicle 100 described herein may be a stand-along vehicle, e.g., not associated with a transportation system or only associated with portions of a transportation system. In various embodiments, the operating environment 150 further includes one or more user devices 154 that communicate with the autonomous vehicle 100 and/or the remote transportation system 152 via a communication network 156.

The communication network 156 supports communication as needed between devices, systems, and components supported by the operating environment 150 (e.g., via tangible communication links and/or wireless communication links). For example, the communication network 156 can include a wireless carrier system 160 such as a cellular telephone system that includes a plurality of cell towers (not shown), one or more mobile switching centers (MSCs) (not shown), as well as any other networking components required to connect the wireless carrier system 160 with a land communications system. Each cell tower includes sending and receiving antennas and a base station, with the base stations from different cell towers being connected to the MSC either directly or via intermediary equipment such as a base station controller. The wireless carrier system 160 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 160. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 160, a second wireless carrier system in the form of a satellite communication system 164 can be included to provide uni-directional or bi-directional communication with the autonomous vehicles 100a-100n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 100 and the station. The satellite telephony can be utilized either in addition to or in lieu of the wireless carrier system 160.

A land communication system 162 may further be included that is a conventional land-based telecommunications network connected to one or more landline telephones and connects the wireless carrier system 160 to the remote transportation system 152. For example, the land communication system 162 may include a public switched telephone network (PSTN) such as that used to provide hardwired telephony, packet-switched data communications, and the Internet infrastructure. One or more segments of the land communication system 162 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 152 need not be connected via the land communication system 162, but can include wireless telephony equipment so that it can communicate directly with a wireless network, such as the wireless carrier system 160.

Although only one user device 154 is shown in FIG. 2, embodiments of the operating environment 150 can support any number of user devices 154, including multiple user devices 154 owned, operated, or otherwise used by one person. Each user device 154 supported by the operating environment 150 may be implemented using any suitable hardware platform. In this regard, the user device 154 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 154 supported by the operating environment 150 is realized as a computer-implemented or computer-based device having the hardware, software, firmware, and/or processing logic needed to carry out the various techniques and methodologies described herein. For example, the user device 154 includes a microprocessor in the form of a programmable device that includes one or more instructions stored in an internal memory structure and applied to receive binary input to create binary output. In some embodiments, the user device 154 includes a GPS module capable of receiving GPS satellite signals and generating GPS coordinates based on those signals. In other embodiments, the user device 154 includes cellular communications functionality such that the device carries out voice and/or data communications over the communication network 156 using one or more cellular communications protocols, as are discussed herein. In various embodiments, the user device 154 includes a visual display, such as a touch-screen graphical display, or other display.

The remote transportation system 152 may include one or more backend server systems, which may be cloud-based, network-based, or resident at the particular campus or geographical location serviced by the remote transportation system 152. The remote transportation system 152 can be manned by a live advisor, or an automated advisor, or a combination of both. The remote transportation system 152 can communicate with the user devices 154 and the autonomous vehicles 100a-100n to schedule rides, dispatch autonomous vehicles 100a-100n, and the like. In various embodiments, the remote transportation system 152 stores store account information such as subscriber authentication information, vehicle identifiers, profile records, behavioral patterns, and other pertinent subscriber information.

In accordance with a typical use case workflow, a registered user of the remote transportation system 152 can create a ride request via the user device 154. The ride request will typically indicate the passenger's desired pickup location (or current GPS location), the desired destination location (which may identify a predefined vehicle stop and/or a user-specified passenger destination), and a pickup time. The remote transportation system 152 receives the ride request, processes the request, and dispatches a selected one of the autonomous vehicles 100a-100n (when and if one is available) to pick up the passenger at the designated pickup location and at the appropriate time. The transportation system 152 can also generate and send a suitably configured confirmation message or notification to the user device 154 to let the passenger know that a vehicle is on the way.

As can be appreciated, the subject matter disclosed herein provides certain enhanced features and functionality to what may be considered as a standard or baseline autonomous vehicle 100 and/or an autonomous vehicle based remote transportation system 152. To this end, an autonomous vehicle and autonomous vehicle based remote transportation system can be modified, enhanced, or otherwise supplemented to provide the additional features described in more detail below.

As previously noted with respect to FIG. 1, the PBM ECU 330a and the SBM ECU 330b are configured to execute, in cooperation with vehicle controller 134 and various hardware to be further detailed, a braking system 300 that establishes a communication path by which hydraulic communication signals are sent from one of the PBM 322 and the SBM 324 and detected by the other in the event of a communication bus failure for the other, as part of the autonomous driving vehicle system 110. The hydraulic communication path provides a way of sending information from one braking module to a braking module otherwise suffering communications failure (e.g. failure in sending and receiving from a connected communications bus). The sent information is used in deciding upon a braking operation by the braking module suffering communication failure.

FIG. 3 is a block or functional diagram of the braking system 300 of FIG. 1, in accordance with an exemplary embodiment. Braking system 300 is configured, in one embodiment, to determine an appropriate braking response when one of the PBM 322 and the SBM 324 loses communication with vehicle controller 134 and/or with the other of the PBM 322 and the SBM 324. The braking system 300 is configured to apply hydraulic pulses (intrusive or non-intrusive) through the other of the PBM 322 and the SBM 324 that encode a communication signal allowing the one of the PBM 322 and the SBM 324 to read the hydraulic communication signal and to determine a braking response based thereon.

Autonomous vehicle 100 (FIG. 1) does not, generally, have brake pedals manually operated by a vehicle occupant. Autonomous vehicle 100 includes braking system 300 for selectively controlling the braking input to wheels 116a-d in response to commands from controller 134 for automated braking. Referring to FIGS. 1 and 3, braking devices 126a-d are typically associated with each of the wheels 116a-d and are typically provided by a brake caliper or other braking element. Wheels 116a-d include front left and right wheels 116a, 116b and rear left and right wheels 116c, 116d in the present embodiment.

A hydraulic circuit 320 including fluid lines is provided for carrying pressurized fluid to the braking devices 126a-d to selectively actuate the brakes during vehicle operation. Hydraulic circuit 320 includes at least four fluid lines connecting fluid pumps 328, 332 with respective braking devices 126a-d.

In the case of autonomous vehicle 100, it may be desirable to have some redundancy in the braking system 300 to ensure braking capability is maintained in the event of a brake component malfunction or failure. To this end, primary and secondary braking modules, PBM 322 and SBM 324, are provided in the braking system 300. During normal operation, a PBM ECU 330a and PBM pump and motor 328 are used to selectively actuate the braking devices 126a-d. In the event of a component failure in the PBM 322, the SBM 324, which includes a SBM ECU 330b and SBM pump and motor 332, may take over for a failed component. The PBM ECU 330a and the SBM ECU 330b may be in communication with any number of components within the braking system 300 in order to perform the functions described herein. Although PBM 322 and SBM 324 include their own pumps and motors 328, 332 and their own ECUs 330a, 300b, they share at least part of fluid lines making up hydraulic circuit 320. PBM 322 and SBM 324 include hydraulic control valves that are in communication with PBM ECU 330a and SBM ECU 330b to assist control of braking operations. In the present embodiment, PBM 322 is positioned upstream of SBM 324 in the hydraulic circuit 320, as will become further clear with reference to FIG. 4. In embodiments, PBM 322 and SBM 324 are both able to control the torque at each wheel independently. In some embodiments, during normal operation PBM 322 performs the required braking and stability functions independently. When there is a failure detected in the PBM 322, the SBM 324 becomes the active module to provide braking and stability functions independently and the PBM 322 becomes dormant. However, embodiments are also envisaged whereby the PBM 322 and the SBM 324 could function cooperatively, e.g. both modules be operational at the same time even in the absence of failure of either PBM 322 or SBM 324.

PBM 322 have wheel speed sensors 444a-b associated with each wheel and sensors (not shown) for sensing angle of the steered wheels, which are in communication with PBM ECU 330a. PBM ECU 330a consumes and utilizes information from an inertial measurement unit to gain accelerations of the vehicle body to be used for stability functions. The PBM 322 also has one or more pressure sensors 442 (see FIG. 4) in order to close loop control actual pressure to a target.

SBM 324, in the present embodiment, utilizes the same sensor inputs. However, depending on the application, SBM 324 could be designed to not have these sensor inputs redundantly.

Accordingly, various vehicle sensors 140a-c communicate with the PBM ECU 330a and the SBM ECU 330b to provide inputs concerning braking and vehicle operating conditions to the controller 134 that are useful for providing desired braking and vehicle stability. Example inputs include vehicle speed (which may be derived from the measured wheel speeds at each wheel), vehicle direction (which may also derived from wheel speed sensor information at each wheel), traction at each wheel (wherein the traction at each wheel may be derived from the wheel slip percent, which is derived as the difference between the estimated vehicle speed (translation of the center of gravity) and the measured wheel speed at the particular wheel), steering wheel position, inertial forces of the vehicle (e.g. linear accelerations such as longitudinal or lateral acceleration or rotational accelerations such as yaw rate, pitch rate, roll rate) and other information. In accordance with various embodiments described herein, each of PBM 322 and SBM 324 are connected to outputs of one or more pressure sensors 442 (see FIG. 4) for sensing hydraulic pressure in hydraulic circuit 320 and to wheel speed sensors 444a-d (see FIG. 4) for determining the individual wheel speeds, which is used to estimate the vehicle velocity and accelerations.

Referring to FIG. 4, braking system 300 is further described with reference to a highly schematic block diagram for explaining concepts of braking system 300, in accordance with various embodiments. FIG. 4 illustrates primary and secondary vehicle controllers 134a, 134b, first, second and third communication buses 404a, 404b, 404c brake fluid reservoir 402, PBM 322, SBM 324, hydraulic circuit 320, braking devices 126a-d, wheels 116a-d and wheel speed sensors 444a-d.

In the exemplary embodiment of FIG. 4, there are primary and secondary vehicle controllers 134a, 134 included in the controller 134 described above. By providing primary and secondary vehicle controllers 134a, 134b, there is redundancy in the event of the primary vehicle controller 134a malfunctioning. Primary and secondary vehicle controllers 134a, 134b execute respective autonomous drivers that, when active, provide braking commands to PBM 322 and SBM 324. PBM 322 primarily interprets commands from the vehicle controllers 134a, 134b and executes a corresponding braking profile through pressurization (by actuating PBM pump and motor 328) of hydraulic fluid in hydraulic lines of hydraulic circuit 320. Braking devices 126a-d react to pressure in hydraulic circuit 320 to exert braking torque on the wheels 116a-d, which then exerts braking forces at the ground by the tire. SBM 324 is provided as a redundant braking module in the event of a malfunction of one or more components or functions of PBM 322. A brake fluid reservoir 402 is provided for supplying hydraulic fluid to PBM 322 and SBM 324 and hydraulic circuit 320.

PBM 322 and SBM 324 are able to communicate with one another over at least second communication bus 404b.

Further, PBM 322 is able to communicate with primary vehicle controller 134*a* over first communication bus 404*a* is able to communication primary and secondary vehicle controllers 134*a*, 134*b* over second communication bus 404*b*. SBM 324 is able to communicate with secondary vehicle controller 134*b* over third communication bus 404*c* and is able to communication with primary and secondary vehicle controllers 134*a*, 134*b* over second communication bus 404*b*. Although two vehicle controllers 134*a*, 134*b* are illustrated in the present embodiment, it is possible to provide different numbers of vehicle controllers and/or communication buses such as just one vehicle controller 134 and one corresponding communication bus 404. In the exemplary embodiment, communication buses 404*a-c* are CAN (Controller Area Network) buses and the various processors, sensors and control units connected to the CAN buses communicate according to a CAN standard. That is, communication buses 404*a-c* each provide, in cooperation with vehicle controllers 134*a*, 134*b* and PBM 322 and SBM 324, a serial communication bus.

The embodiment of FIG. 4 illustrates wheel speed sensors 444*a-d* and/or other motion sensors (e.g. inertial measurement unit and/or GPS device and/or vision system (such lidar, radar, etc.) capable of sensing vehicle deceleration) and optional one or more pressure sensors 442. Pressure sensors 442 are capable of sensing non-intrusive hydraulic pulses indicative of one of the PBM 322 and SBM 324 being functional whereas wheel speed sensors 444*a-d* are capable of measuring intrusive hydraulic pulses indicative of one of PBM 322 and SBM 324 being functional. In the following, an embodiment is described whereby both of wheel speed sensors 444*a-d* and pressure sensors 442 are used to detect whether one of PBM 322 and SBM 324 are still functioning by applying hydraulic pulses. However, it should be appreciated that just wheel speed sensors (or other sensors capable of measuring vehicle deceleration as a result of an applied braking operation) could be used.

In accordance with various embodiments, when there is a communications failure at SBM 324, PBM 322 is configured to detect whether SBM 324 is suffering from a communications failure in that SBM 324 is not able to send and receive communications over communications buses 404*a-c*. Such a communications failure could occur as a single point failure caused by, for example, water in a connector 443*b* between second and third communications buses 404*b*, 404*cc* and SBM 324. In one example, PBM 322 is configured to detect the communications failure at SBM 324 based on absence of communication from SBM 324 on communications buses 404*a-c*. In embodiments, communications failure can be determined by absence of communication from SBM 324 over a certain period of time or absence of communication in response to a request from PBM 322. SBM 324 is similarly configured to detect communications failure based on absence of communications being received over communications buses 404*a-c* for a certain period of time or in response to a request. For example, SBM 324 is configured to detect a lack of communication from either of vehicle controllers 134*a*, 134*b* or from PBM 322. In this way, both PBM 322 and SBM 324 has detected a communications failure of SBM 324.

When loss of communication with the SBM 322 has been detected by the PBM 324 and PBM 322 is still in communication with one or both of vehicle controllers 134*a*, 134*b*, PBM 322 is configured to apply one or more hydraulic pulses in hydraulic circuit 320. In embodiments, one or more hydraulic pulses can be intrusive or non-intrusive. Non-intrusive hydraulic pulses are detectable by a pressure sensor 442 but not usually discernable as a braking operation by passengers of the autonomous vehicle 100 because the hydraulic pulses have no substantive impact on motion of the autonomous vehicle 100. Intrusive hydraulic pulses impact upon motion of the autonomous vehicle 100 and can be detected based thereon. SBM 324 is configured to detect the one or more hydraulic pulses using output from one or more pressure sensors 442 (e.g. when the hydraulic pulses are non-intrusive) or using output from one or more wheel speed sensors 116*a-*116*d* (e.g. when the hydraulic pulses are intrusive) or output from an inertial measurement unit or GPS or vision system (e.g. when the hydraulic pulses are intrusive) or any other sensor measuring motion of vehicle 100. Wheel speed sensors 116*a-*116*d* or one or more pressure sensors 442 communicate directly with PBM 322 and SBM 324, rather than via communications buses 404*a-c*, and thus allow fast response times.

When the one or more hydraulic pulses have been identified, or absence thereof has been identified, SBM 324 is configured to select a braking profile based thereon. The presence of one or more hydraulic pulses indicates to SBM 324 that PBM 322 is still functioning. This indication has been provided to SBM 324 without receipt of electronic control or messaging signals from SBM 324 to PBM 322. Thus, SBM 324 (or PBM 322 or vehicle controller 134) can select a braking profile that is more gradual than an emergency braking profile that might have been selected without the insurance of knowing that PBM 322 remains operational. Alternatively, SBM 324 may not need to apply a braking profile as the pulses that it is receiving means that the other module (PBM 322) is still functional and can execute braking commands from the vehicle controller 134*a*, 134*b*. Thus, emergency braking is deferred. When the SBM 324 stops receiving hydraulic pulses from the PBM 324, the SBM 324 could then assume that the PBM 322 has failed and the SBM 324 could then apply the emergency braking profile. In embodiments, autonomous vehicle 100, e.g. through one of vehicle controllers 134*a*, 134, and/or PBM ECU 330*a* and PBM 322 and/or SBM ECU 330*b* and SBM 324, is configured to execute a non-emergency braking operation. The absence of one of one or more hydraulic pulses indicates to SBM 324 that PBM 322 may also not be functioning properly. When SBM 324 detects absence of one or more hydraulic pulses, SBM 324 selects and executes an emergency braking operation. It is possible that PBM 322 is configured to encode more than two different commands for braking profiles in a pattern of hydraulic pulses set by PBM 322 (e.g. more than commands for emergency braking profile and non-emergency braking profile). Hydraulic pulses can be generated that encode 1, 2 ton commanded braking profiles. SBM 324 is configured to identify the pattern of hydraulic pulses, decode the pattern and select and execute an associated different braking profile. Put another way, multiple types of hydraulic pulse characteristics could be communicated, which when measured and interpreted by the other braking module could be responded by different braking profiles, each braking braking profile defined by defined by different pressure versus time characteristics.

Emergency braking is considered an immediate pressure build up to maximum vehicle deceleration. This would not be a pull over to the side of the road maneuver. It is possible to have many different profiles of brake pressure application which will cause a corresponding vehicle deceleration profile. For example, various pressure vs. time profiles could be defined such as a slow ramp to a medium pressure, or a fast ramp to a low pressure, but then after an amount of time at that pressure a medium build up of pressure to a high pressure value. Any set of profiles could be defined, only limited by the unique characteristics that could be communicated via various hydraulic pulses.

In accordance with various embodiments, when there is a communications failure at PBM 322, SBM 324 is configured to detect whether PBM 322 is suffering from a communications failure in that PBM 322 is not able to send and receive communications over communications buses 404a-c. Such a communications failure could occur as a single point failure caused by, for example, water in a connector 443a between first and second communications buses 404a, 404b and PBM 322. In one example, SBM 324 is configured to detect the communications failure at PBM 322 based on absence of communication from PBM 322 on communications buses 404a, 404b. In embodiments, communications failure can be determined by absence of communication from PBM 322 over a certain period of time or absence of communication in response to a request from SBM 324. PBM 322 is similarly configured to detect communications failure based on absence of communications being received over communications buses 404a-c for a certain period of time or in response to a request. For example, PBM 322 is configured to detect a lack of communication from either of vehicle controllers 134a, 134b or from SBM 324. In this way, both SBM 324 and PBM 322 has detected a communications failure of PBM 322.

When the loss of communication with the PBM 322 has been detected by the SBM 324 and the SBM 324 is still able to communicate with one or both of vehicle controllers 134a, 134b, SBM 324 is configured to apply one or more hydraulic pulses in hydraulic circuit 320. In embodiments, one or more hydraulic pulses are intrusive, as described above. PBM 322 is configured to detect the one or more hydraulic pulses using output from one or more wheel speed sensors 116a-116d (e.g. when the hydraulic pulses are intrusive) or output from an inertial measurement unit (e.g. when the hydraulic pulses are intrusive) or any other sensor measuring motion of vehicle. Since SBM 324 is positioned downstream of PBM 322, application of non-intrusive hydraulic pulses by SBM 324 would likely not be detectable by one or more pressure sensors 442 of PBM 322.

When the one or more hydraulic pulses have been identified, or absence thereof has been identified, PBM 322 is configured to select a braking profile based thereon. The presence of one or more hydraulic pulses indicates to PBM 322 that SBM 324 is still functioning and can still receive communication from one of the vehicle controllers. This means that if the PBM 322 were to experience a subsequent failure, the SBM 324 could still provide braking. This indication has been provided to PBM 322 without receipt of electronic control or messaging signals from PBM 322 to SBM 324. Thus, PBM 322 (or SBM 324 or vehicle controller 134) can select a braking profile that is more gradual than an emergency braking profile that might have been selected without the insurance of knowing that SBM 324 remains operational. Alternatively, PBM 322 may not need to apply a braking profile as the pulses that it is receiving means that the other module (SBM) is still functional and can execute braking commands from the vehicle controller 134a, 134b. Thus, emergency braking is deferred. When the PBM 322 stops receiving hydraulic pulses from the SBM 324, the PBM 322 could then assume that the SBM 324 has failed and the PBM 322 could then apply the emergency braking profile. In embodiments, autonomous vehicle 100, e.g. through one of vehicle controllers 134a, 134, and/or PBM ECU 330a and PBM 322 and/or SBM ECU 330b and SBM 324, is configured to execute a non-emergency braking operation. The absence of one or more hydraulic pulses indicates to PBM 322 that SBM 324 may also not be functioning properly. When PBM 322 detects absence of one or more hydraulic pulses, PBM 322 selects and executes an emergency braking operation. It is possible that SBM 324 is configured to encode more than two different commands for braking profiles in a pattern of hydraulic pulses set by SBM 324 (e.g. more than commands for emergency braking profile and non-emergency braking profile). Hydraulic pulses can be generated that encode 1, 2 to n commanded braking profiles. SBM 324 is configured to identify the pattern of hydraulic pulses, decode the pattern and select and execute an associated different braking profile.

Figure 5:
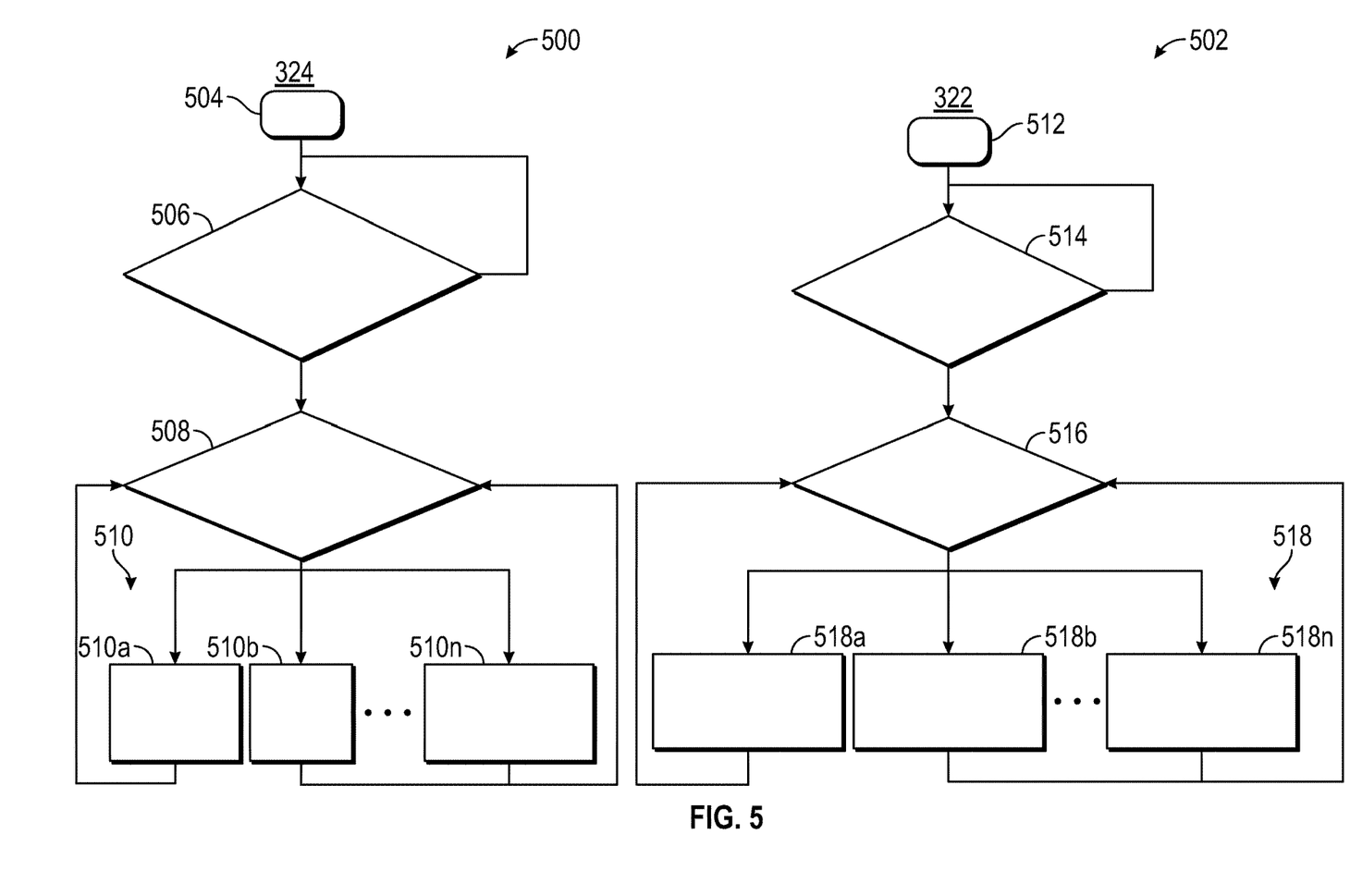
FIG. 5 is a flowchart illustrating braking methods in accordance with an exemplary embodiment.

FIG. 5 depicts a flowchart illustrating methods 500, 502 performed by PBM 322 and SBM 324 to show operations performed in the event of communications failure at SBM 324. As can be appreciated in light of the disclosure, the order of operation within the methods 500, 502 is not limited to the sequential execution as illustrated in FIG. 5, but may be performed in one or more varying orders as applicable and in accordance with the present disclosure. In various embodiments, the methods 500, 502 can be scheduled to start (steps 504, 512) based on one or more predetermined events, and/or can run continuously during operation of the autonomous vehicle. Method 500 illustrates a branch of steps being performed by SBM 324 and method 502 illustrates a branch of steps being performed by PBM 322. Methods 500, 502 run in parallel.

At step 506, SBM 324 detects whether there has been a loss of communication with PBM 322 or with vehicle controller 134 (which can include primary and secondary vehicle controllers 134a, 134b in some embodiments) over communications bus 404 (which can include first, second and third communication buses 404a-c in some embodiments). Detection of whether there has been a loss of communications can be performed by detecting whether communications have been received from communications bus 404 in a certain period of time or in response to a request from SBM 324 or by a dedicated fault sensor included in SBM 324. When there is no communications failure detected, SBM 324 repeats detection step 506 in a periodically repeated loop. At step 514, PBM 322 detects a loss of communication with SBM 324 by detecting whether communications have been received from SBM 324 over communications bus 404 in a certain period of time or in response to a request from PBM 322. When there is no communications failure detected, PBM 322 repeats detection step 514 in a periodically repeated loop.

When there has been a communications failure detected, SBM 324 and PBM 322 perform steps 508 and 516, respectively. At step 516, PBM 322 determines upon a required behavior from SBM 324. In some embodiments where there is only one braking profile response to be performed by SBM 324 (in addition to emergency braking), PBM 322 outputs just one type of hydraulic pressure pattern (e.g. hydraulic pressure pulses). In other embodiments, PBM 322 may wish to select from a range of braking behaviors to send as commands to SBM 324. For example, there could be a no braking profile encoded in a first pressure pattern and 2 to n other braking profiles encoded in 2 to n pressure patterns. Step 516 can be performed by PBM 322 in conjunction with commands from vehicle controller 134 or independently. Each possible braking behavior determined in step 516 is associated, by PBM 322, with a different SBM braking profile. As such, after determining required SBM braking behavior in step 516, PBM 322 generates a corresponding pressure pattern in step 518. The hydraulic pressure pattern encodes a braking response that can be read and executed by SBM 324. In exemplary embodiments, the hydraulic pressure pattern is superimposed on braking output performed by PBM 322. The hydraulic pressure pattern can encode a no braking response (step 518*a*), braking profile 2 (step 518*b*) and braking profile n (step 518*n*) that correspond, in some embodiments, to different types of braking response (such as different deceleration rates). The superimposed hydraulic pressure pattern is non-intrusive in the present embodiment.

In step 508, SBM 324 detects the pressure pattern using one or more pressure sensors 442 of SBM 324. The SBM 324 responds to the detected pressure pattern by executing a corresponding braking profile. In some embodiments, SBM 324 detects presence or absence of the pressure pattern in step 508 and outputs an emergency braking profile in step 510*a* when there is absence of the pressure pattern has been detected and outputs a more gradual braking profile (e.g. in step 510*n*) when presence of the pressure pattern has been detected. In other embodiments, SBM 324 decodes the detected pressure pattern into braking commands and executes corresponding braking profiles including emergency braking in step 510*a* when no pressure pattern is detected, no braking in step 510*b* when a first pressure pattern is detected, and one or more different braking deceleration profiles (deceleration rates) when other patterns up to pattern n are detected (e.g. in step 510*n*). In other embodiments, the braking response is executed by PBM 322 (possibly in conjunction with vehicle controller 134) in addition to, or alternately to, the braking response being executed by SBM 324.

Accordingly, in an exemplary embodiment, there are failure modes with first to third communication (CAN) busses 404*a-c* and two go to each brake module 322, 324 where with one single point failure (e.g. water in the SBM connector 443*b* which fails second and third communication busses 404*b*, 404*c*) where the SBM 324 is still functional but cannot communicate with the vehicle controllers 134*a*, 134*b*, but the PBM 322 is still capable of communicating with the vehicle controller 134*a* (e.g. through the first communication bus 404*a*). In this case, the PBM 322 would start applying hydraulic pulses which when registered by the SBM 324, the SBM 324 will defer executing an emergency braking maneuver for the duration that it is still registering the hydraulic pulses that are generated by the PBM 322.

Figure 6:
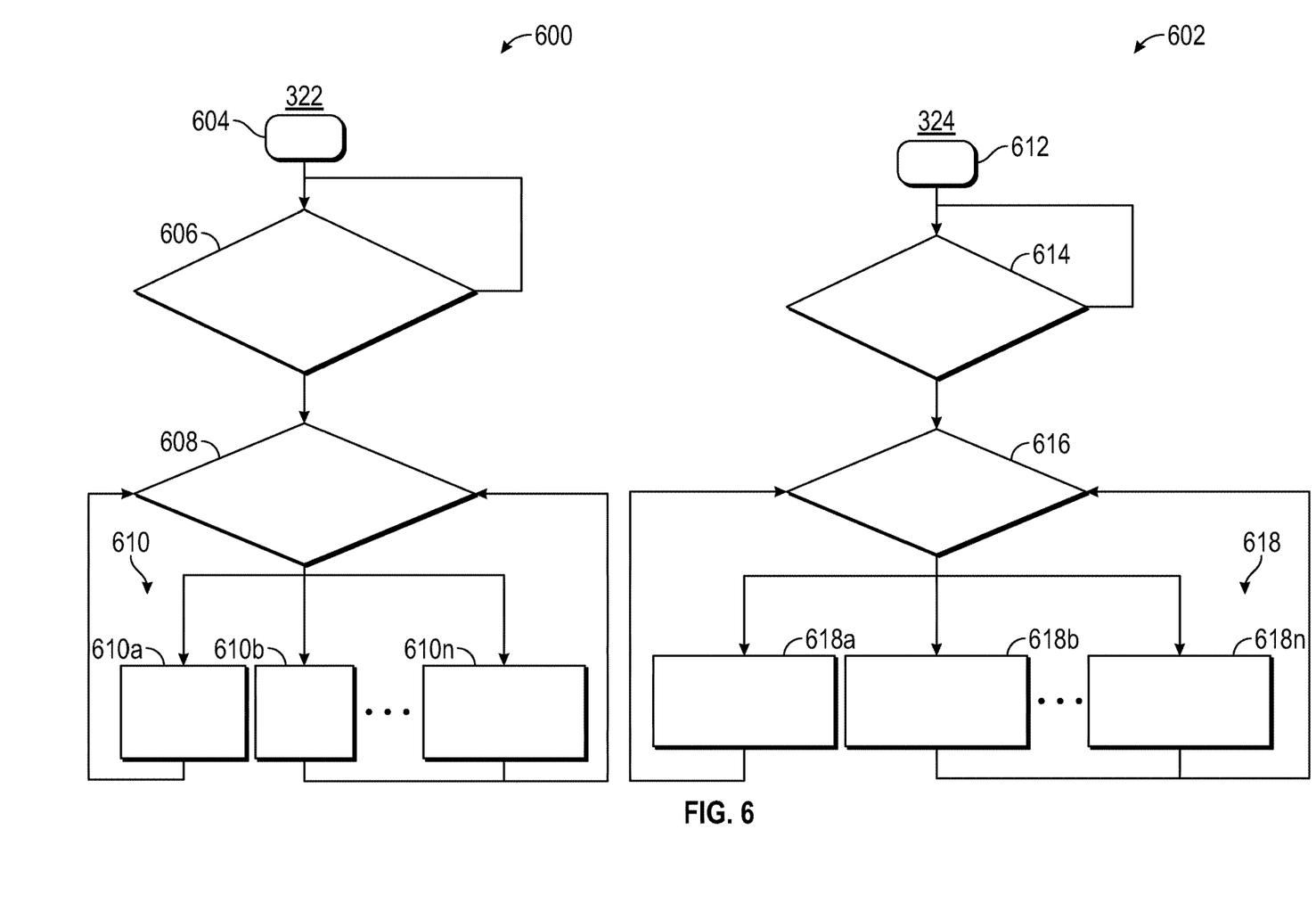
FIG. 6 is a flowchart illustrating braking methods in accordance with an exemplary embodiment.

FIG. 6 depicts a flowchart illustrating methods 600, 602 performed by PBM 322 and SBM 324 to show operations performed in the event of communications failure at PBM 322. As can be appreciated in light of the disclosure, the order of operation within the methods 600, 602 is not limited to the sequential execution as illustrated in FIG. 6, but may be performed in one or more varying orders as applicable and in accordance with the present disclosure. In various embodiments, the methods 600, 602 can be scheduled to start (steps 604, 612) based on one or more predetermined events, and/or can run continuously during operation of the autonomous vehicle. Method 600 illustrates a branch of steps being performed by PBM 322 and method 602 illustrates a branch of steps being performed by SBM 324. Methods 600, 506 run in parallel.

At step 606, PBM 322 detects whether there has been a loss of communication with SBM 324 or with vehicle controller 134 (which can include primary and secondary vehicle controllers 134*a*, 134*b* in some embodiments) over communications bus 404 (which can include first and second communication buses 404*a*, 404*b* in some embodiments). Detection of whether there has been a loss of communications can be performed by detecting whether communications have been received from communications bus 404 in a certain period of time or in response to a request from PBM 322 or by a dedicated fault sensor included in PBM 322. When there is no communications failure detected, PBM 322 repeats detection step 606 in a periodically repeated loop. At step 614, PBM 322 detects a loss of communication with PBM 322 by detecting whether communications have been received from PBM 322 over communications bus 404 in a certain period of time or in response to a request from SBM 324. When there is no communications failure detected, SBM 322 repeats detection step 614 in a periodically repeated loop.

When there has been a communications failure detected, PBM 322 and SBM 324 perform steps 608 and 616, respectively. At step 616, SBM 324 determines upon a required braking behavior from PBM 322. In some embodiments where there is only one braking profile response to be performed by PBM 322 (in addition to emergency braking response), SBM 324 outputs just one type of hydraulic pressure pattern (e.g. hydraulic pressure pulses). In other embodiments, SBM 324 may wish to select from a range of braking behaviors to send as commands to PBM 322. For example, there could be a no braking profile encoded in a first hydraulic pressure pattern and 2 to n other braking profiles encoded in second to n pressure patterns. Step 616 can be performed by SBM 324 in conjunction with commands from vehicle controller 134 or independently. Each possible braking behavior determined in step 616 is associated, by SBM 324, with a different PBM braking profile. As such, after determining required PBM braking behavior in step 616, SBM 322 generates a corresponding hydraulic pressure pattern in step 618. The hydraulic pressure pattern encodes a braking response that can be read and executed by PBM 322. In exemplary embodiments, the hydraulic pressure pattern is superimposed on braking output performed by SBM 324. The hydraulic pressure pattern can encode a no braking response (step 618*a*), braking profile 2 (step 618*b*) and braking profile n (step 618*n*) that correspond, in some embodiments, to different types of braking response (such as different deceleration rates). The superimposed hydraulic pressure pattern is intrusive in the present embodiment. However, an embodiment is envisaged whereby superimposed hydraulic pressure pattern is non-intrusive if the upstream primary brake module 322 is incorporated with a pressure sensor 442 which is plumbed downstream of the secondary brake module 324, i.e. the PBM 322 has a pressure sensor 442 which measures the pressure that comes out of the SBM 324. Thus, hydraulic pressure patterns of step 618 can be sensed as different wheel speeds by wheel speed sensors 126*a-d* or other impacts on vehicle motion sensed by other vehicle motion sensors such as an inertial measurement unit or GPS device or by a specially configured pressure sensor.

In step 608, PBM 322 detects the braking effects resulting from intrusive hydraulic pressure patterns using one or more wheel speed sensors 126*a-d*, an inertial measurement unit, a GPS device, a vision system and/or other motional sensors. In some embodiments, the braking pattern is derived from a pattern of wheel speed change detected by wheel speed sensors 126*a-d*. The PBM 322 responds to the detected braking pattern by executing a corresponding braking profile. The barking pattern detected in step 608 corresponds to an intrusive hydraulic pressure pattern imparted by SBM 324 in step 616. In some embodiments, PBM 322 detects presence or absence of the braking pattern in step 608 and outputs an emergency braking profile in step 610*a* when absence of the braking pattern has been detected and outputs a more gradual braking profile (e.g. in step 610*n*) when presence of the braking pattern has been detected. In other embodiments, PBM 322 decodes the detected braking pattern into braking commands and executes corresponding braking profiles including emergency braking in step 610*a* when no pressure pattern is detected, no braking in step 610*b* when a first braking pattern is detected, and one or more different braking deceleration profiles (deceleration rates) when other braking patterns up to pattern n are detected (e.g. in step 510*n*). In other embodiments, the braking response is executed by SBM 324 (possibly in conjunction with vehicle controller 134) in addition to, or alternately to, the braking response being executed by PBM 322.

Accordingly, in an exemplary embodiment, there are failure modes with first to third communication (CAN) busses 404*a-c* and two go to each brake module 322, 324 where with one single point failure (e.g. water in the PBM connector 443*a* which fails first and second communication busses 404*a,b*) where the PBM 322 is still functional but cannot communicate with the vehicle controllers 134*a*, 134*b*, but the SBM 324 is still capable of communicating with the vehicle controller 134*b* (e.g. through the third communication bus 404*c*). In this case, the SBM 324 would start applying hydraulic pulses which when registered by the PBM 322, the PBM 322 will defer executing an emergency braking maneuver for the duration that it is still registering the hydraulic pulses that are generated by the SBM 324.

Systems and methods described herein address an issue of unnecessary loss of control of autonomous vehicle 100 by allowing other braking actions than emergency braking when PBM 322 or SBM 324 loses communication. Each of PBM 322 and SBM 324 are designed with emergency braking behavior when it loses communication with a source of its commands and when no communication via the hydraulic communication path is received from the other braking module. Systems and methods described herein further allow for a less severe braking operation when the other braking module is indicated (via the hydraulic communication path) to be alive and communicating with the vehicle controller 134. Systems and methods described herein utilize a redundant, hydraulic, communication path to a module that experienced full loss of serial data communication over the communication bus 404. The hydraulic communication path utilizes existing/core hardware (hydraulic circuitry) of the braking system 300 to accomplish a redundant communication path without requiring hardware infrastructure modifications. Yet further, systems and methods described herein allow for specific braking responses to be elicited based on different hydraulic patterns being communicated.

In one embodiment described herein, systems and methods according to the present disclosure add an extra communication path from an upstream PBM 322 to a downstream SBM 324 without adding any extra hardware. The systems and methods utilize wheel speed sensors 126*a-d* to infer the health and availability of the SBM 324 and prevent unnecessary emergency braking when the SBM 324 is active and healthy. In embodiments, upon full loss of communication in SBM 324 with PBM 322 and vehicle controller 134, PBM 322 will apply a pre-defined, non-intrusive amount of pressure/pressure pattern in the hydraulic circuit 320. Since SBM 324 has at least one (e.g. including two or three) pressure sensors in the hydraulic circuit 320, SBM 324 can verify whether the measured pressure matches an expected value/pattern. Successful detection of the pressure pattern is inferred as PBM 322 being in a healthy and alive state. This allows autonomous vehicle 100 to execute a, for example, Degraded State 3 (pull to the side of the road) rather than Degraded State 5 (emergency braking). If at any point PBM 322 becomes faulty/goes down at the same time as SBM 322 having a communications failure, SBM 324 will detect the failure since the expected pattern is lost. This will result in SBM 324 executing a default emergency braking; i.e. causing a Degraded State 5 (e.g. a default maximum braking operation).

In another embodiment described herein, systems and methods described herein suppress execution of a default maximum braking operation by a braking module suffering a communications failure when the vehicle controller 134 still has control over vehicle deceleration via another braking module. Such systems and methods add an extra hydraulic communication path to either of upstream or downstream PBM 322 or SBM 324 without adding any extra hardware by utilizing motion sensors to infer the health and availability of the other braking module (such as wheel speed sensors 444*a-d*, GPS or vision system to measure changes to vehicle motion) and will prevent from unnecessary emergency braking when the other braking module is active and healthy. Upon full loss of communication in PBM 322 with SBM 324 and vehicle controller 134, SBM 324 will execute a predefined minimally intrusive braking event (which corresponds to application of one or more hydraulic pulses). Since PBM 322 has direct access to wheel speed sensor measurements (for example), PBM 322 can verify whether the wheel speed matches the expected pattern that would be induced by the applied braking pattern. Successful verification allows PBM 322 to infer SBM 324 as being in a healthy and active state. In that event, autonomous vehicle 100 executes a, for example, Degraded State 3 (pull to the side of the road) rather than Degraded State 5 (maximum braking operation). If at any point SBM 324 becomes faulty/goes down at the same time as PBM 322 losing communication, PBM 322 will detect the dual failure since the expected pattern is lost. This will result in PBM 322 executing a default maximum braking; i.e. causing a Degraded State 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A braking system for an autonomous vehicle, comprising:
 a primary braking module (PBM) comprising a PBM electronic control unit and at least one sensor;
 a secondary braking module (SBM) comprising a SBM electronic control unit and at least one sensor, wherein the at least one sensor of the PBM, the at least one sensor of the SBM, or both, includes at least one wheel speed sensor;
 braking devices associated with respective wheels of the autonomous vehicle;
 a hydraulic circuit connected between the PBM and the braking devices and connected between the SBM and the braking devices;

a communications bus connected between an autonomous driving system and each of the PBM and the SBM;

wherein one of the PBM electronic control unit and the SBM electronic control unit is configured to:
  detect a communications failure of the other of the PBM electronic control unit and the SBM electronic control unit over the communication bus; and
  in response to detecting the communications failure, apply a predetermined hydraulic pressure operation in the hydraulic circuit; and wherein the other of the PBM electronic control unit and the SBM electronic control unit is configured to:
  identify, based on output from the at least one sensor including the at least one wheel speed sensor, the predetermined hydraulic pressure operation, or the absence thereof, being applied by the one of the PBM electronic control unit and the SBM electronic control unit, and determining whether a pressure pattern of the hydraulic pressure operation is consistent with healthy or degraded operation of the one of the PBM electronic control unit and the SBM electronic control unit; and
  select and execute a braking operation based on the identifying of the predetermined hydraulic pressure operation and the determining of whether the pressure pattern of the hydraulic pressure operation is consistent with healthy or degraded operation of the one of the PBM electronic control unit and the SBM electronic control unit, wherein the selecting and executing of the braking operation comprises:
    executing a first braking operation comprising a less than maximum braking operation, when the communications failure is detected of the other of the PBM electronic control unit and the SBM electronic control unit and the pressure pattern is consistent with healthy operation of the one of the PBM electronic control unit and the SBM electronic control unit; and
    executing a second braking operation comprising a maximum braking operation, when the communications failure is detected of the other of the PBM electronic control unit and the SBM electronic control unit and the pressure pattern is consistent with degraded operation of the one of the PBM electronic control unit and the SBM electronic control unit.

2. The braking system of claim 1, wherein the predetermined hydraulic pressure operation is hydraulic pulses and the at least one sensor further includes a pressure sensor configured to sense the hydraulic pulses.

3. The braking system of claim 2, wherein the hydraulic pulses are non-intrusive for any passengers in the autonomous vehicle.

4. The braking system of claim 1, wherein the predetermined hydraulic pressure operation applies sufficient hydraulic pressure to perform a braking operation and the at least one sensor is configured to sense effects of braking on the motion of the autonomous vehicle.

5. The braking system of claim 4, wherein the at least one sensor further includes an inertial measurement unit and/or a GPS device and/or a vision system.

6. The braking system of claim 1, wherein the at least one sensor further includes at least one pressure sensor and the PBM electronic control unit is further configured to:
  detect a communications failure of the SBM electronic control unit over the communication bus; and
  in response to detecting the communications failure, apply a predetermined pattern of hydraulic pressure pulses in the hydraulic circuit; and wherein the SBM electronic control unit is configured to:
  identify, based on output from the at least one pressure sensor, the predetermined pattern of hydraulic pressure pulses, or the absence thereof, being applied by the PBM electronic control unit; and wherein the SBM electronic control unit, the PBM electronic control unit and/or an autonomous vehicle controller is configured to select and execute a braking operation based on the identifying of the predetermined pattern of hydraulic pressure pulses.

7. The braking system of claim 6, wherein the at least one sensor further includes at least one motion sensor and the SBM electronic control unit is further configured to:
  detect a communications failure of the PBM electronic control unit over the communication bus; and
  in response to detecting the communications failure, apply a predetermined braking operation using the hydraulic circuit; and wherein the PBM electronic control unit is further configured to:
  identify, based on output from the at least one motion sensor, the predetermined braking operation being applied by the SBM electronic control unit; and wherein the PBM electronic control unit, the SBM electronic control unit and/or an autonomous vehicle controller is further configured to select and execute a braking operation based on the identifying of the predetermined pattern of hydraulic pressure pulses.

8. The braking system of claim 1, wherein the other of the PBM electronic control unit and the SBM electronic control unit is further configured to select and execute an emergency braking operation when the predetermined hydraulic pressure operation is not identified and wherein the PBM electronic control unit, the SBM electronic control unit and/or an autonomous vehicle controller is further configured to select and execute a braking operation by which the vehicle pulls over to the side of the road when the predetermined hydraulic pressure operation is identified.

9. The braking system of claim 6, wherein the at least one sensor further includes at least one motion sensor and the SBM electronic control unit is further configured to:
  detect a communications failure of the PBM electronic control unit over the communication bus; and
  in response to detecting the communications failure, apply a predetermined braking operation using the hydraulic circuit; and wherein the PBM electronic control unit is further configured to:
  identify, based on output from the at least one motion sensor, the predetermined braking operation, or the absence thereof, being applied by the SBM electronic control unit; and wherein the PBM electronic control unit, the SBM electronic control unit and/or an autonomous vehicle controller is configured to select and execute a braking profile based on the identifying of the predetermined pattern of hydraulic pressure pulses.

10. The braking system of claim 1, wherein the other of the PBM electronic control unit and the SBM electronic control unit is further configured to select and execute an emergency braking profile when the predetermined hydraulic pressure operation is not identified and wherein the PBM electronic control unit, the SBM electronic control unit and/or an autonomous vehicle controller is further configured to select and execute a braking operation by which the vehicle pulls over to the side of the road when the predetermined hydraulic pressure operation is identified.

11. A method for braking in an autonomous vehicle, the autonomous vehicle comprising:
   a primary braking module (PBM) comprising a PBM electronic control unit and at least one sensor;
   a secondary braking module (SBM) comprising a SBM electronic control unit and at least one sensor, wherein the at least one sensor of the PBM, the at least one sensor of the SBM, or both, includes at least one wheel speed sensor;
   braking devices associated with respective wheels of the autonomous vehicle;
   a hydraulic circuit connected between the PBM and the braking devices and connected between the SBM and the braking devices; and
   a communications bus connected between an autonomous driving system and each of the PBM and the SBM;
   the method comprising:
   one of the PBM electronic control unit and the SBM electronic control unit performing the steps:
      detecting a communications failure of the other of the PBM electronic control unit and the SBM electronic control unit over the communication bus; and
      in response to detecting the communications failure, applying a predetermined hydraulic pressure operation in the hydraulic circuit; and
   the other of the PBM electronic control unit and the SBM electronic control unit performing the steps:
      identifying, based on output from the at least one sensor including the at least one wheel speed sensor, the predetermined hydraulic pressure operation, or the absence thereof, being applied by the one of the PBM electronic control unit and the SBM electronic control unit, and determining whether a pressure pattern of the hydraulic pressure operation is consistent with healthy or degraded operation of the one of the PBM electronic control unit and the SBM electronic control unit; and
      selecting and executing a braking operation based on the identifying of the predetermined hydraulic pressure operation and the determining of whether the pressure pattern of the hydraulic pressure operation is consistent with healthy or degraded operation of the one of the PBM electronic control unit and the SBM electronic control unit, wherein the selecting and executing of the braking operation comprises:
         executing a first braking operation comprising a less than maximum braking operation, when the communications failure is detected of the other of the PBM electronic control unit and the SBM electronic control unit and the pressure pattern is consistent with healthy operation of the one of the PBM electronic control unit and the SBM electronic control unit; and
         executing a second braking operation comprising a maximum braking operation, when the communications failure is detected of the other of the PBM electronic control unit and the SBM electronic control unit and the pressure pattern is consistent with degraded operation of the one of the PBM electronic control unit and the SBM electronic control unit.

12. The method of claim 11, wherein the predetermined hydraulic pressure operation is application of hydraulic pulses and the at least one sensor further includes a pressure sensor sensing the hydraulic pulses.

13. The method of claim 12, wherein the hydraulic pulses are non-intrusive for any passengers in the autonomous vehicle.

14. The method of claim 11, wherein the predetermined hydraulic pressure operation applies sufficient hydraulic pressure to perform a braking operation and the at least one sensor further senses effects of braking on the motion of the autonomous vehicle.

15. The braking system of claim 14, wherein the at least one sensor further includes an inertial measurement unit and/or a GPS device and/or a vision system.

16. The method of claim 11, wherein the at least one sensor further includes at least one pressure sensor and the PBM electronic control unit further performs the steps:
   detecting a communications failure of the SBM electronic control unit over the communication bus; and
   in response to detecting the communications failure, applying a predetermined pattern of hydraulic pressure pulses in the hydraulic circuit; and
   wherein the SBM electronic control unit performs the step:
      identifying, based on output from the at least one pressure sensor, the predetermined hydraulic pressure pulses, or the absence thereof, being applied by the PBM electronic control unit; and
      wherein the SBM electronic control unit, and/or the PBM electronic control unit and/or an autonomous vehicle controller selects and executes a braking profile based on the identifying of the predetermined pattern of hydraulic pressure pulses.

17. The method of claim 11, wherein the at least one sensor further includes at least one motion sensor and the SBM electronic control unit further performs the steps:
   detecting a communications failure of the PBM electronic control unit over the communication bus; and
   in response to detecting the communications failure, applying a predetermined braking operation using the hydraulic circuit; and
   wherein the PBM electronic control unit performs the step:
   identifying, based on output from the at least one motion sensor, the predetermined braking operation, or the absence thereof, being applied by the SBM electronic control unit; and
   wherein the PBM electronic control unit, the SBM electronic control unit and/or an autonomous vehicle controller selects and executes a braking profile based on the identifying of the predetermined pattern of hydraulic pressure pulses.

18. The method of claim 11, wherein the other of the PBM electronic control unit and the SBM electronic control unit selects and executes an emergency braking profile when the predetermined hydraulic pressure operation is not identified and the PBM electronic control unit, the SBM electronic control unit and/or an autonomous vehicle controller selects and executes a braking operation by which the vehicle pulls over to the side of the road when the predetermined hydraulic pressure operation is identified.

19. An autonomous vehicle, comprising:
   a primary braking module (PBM) comprising a PBM electronic control unit and at least one sensor;
   a secondary braking module (SBM) comprising a SBM electronic control unit and at least one sensor, wherein the at least one sensor of the PBM, the at least one sensor of the SBM, or both, includes at least one wheel speed sensor;

braking devices associated with respective wheels of the autonomous vehicle;

a hydraulic circuit connected between the PBM and the braking devices and connected between the SBM and the braking devices;

a communications bus connected between an autonomous driving system and each of the PBM and the SBM;

wherein one of the PBM electronic control unit and the SBM electronic control unit is configured to:
   detect a communications failure of the other of the PBM electronic control unit and the SBM electronic control unit over the communication bus; and
   in response to detecting the communications failure, apply a predetermined hydraulic pressure operation in the hydraulic circuit; and wherein the other of the PBM electronic control unit and the SBM electronic control unit is configured to:
   identify, based on output from the at least one sensor including the at least one wheel speed sensor, the predetermined hydraulic pressure operation, or the absence thereof, being applied by the one of the PBM electronic control unit and the SBM electronic control unit, and determining whether a pressure pattern of the hydraulic pressure operation is consistent with healthy or degraded operation of the one of the PBM electronic control unit and the SBM electronic control unit; and
   select and execute a braking operation based on the identifying of the predetermined hydraulic pressure operation and the determining of whether the pressure pattern of the hydraulic pressure operation is consistent with healthy or degraded operation of the one of the PBM electronic control unit and the SBM electronic control unit, wherein the selecting and executing of the braking operation comprises:
      executing a first braking operation comprising a less than maximum braking operation, when the communications failure is detected of the other of the PBM electronic control unit and the SBM electronic control unit and the pressure pattern is consistent with healthy operation of the one of the PBM electronic control unit and the SBM electronic control unit; and
      executing a second braking operation comprising a maximum braking operation, when the communications failure is detected of the other of the PBM electronic control unit and the SBM electronic control unit and the pressure pattern is consistent with degraded operation of the one of the PBM electronic control unit and the SBM electronic control unit.

20. The autonomous vehicle of claim 19, wherein the at least one sensor further includes at least one pressure sensor and the PBM electronic control unit is further configured to:
   detect a communications failure of the SBM electronic control unit over the communication bus; and
   in response to detecting the communications failure, apply a predetermined pattern of hydraulic pressure pulses in the hydraulic circuit; and
   wherein the SBM electronic control unit is further configured to:
      identify, based on output from the at least one pressure sensor, the predetermined hydraulic pressure pulses, or the absence thereof, being applied by the PBM electronic control unit; and
      wherein the PBM electronic control unit, the SBM electronic control unit and/or an autonomous vehicle controller is configured to select and execute a braking operation based on the identifying of the predetermined pattern of hydraulic pressure pulses.

* * * * *